United States Patent
Mazzer

(10) Patent No.: US 10,016,093 B2
(45) Date of Patent: Jul. 10, 2018

(54) COFFEE GRINDER-DISPENSER

(71) Applicant: MAZZER LUIGI S.P.A., Gardigiano di Scorze' (IT)

(72) Inventor: Giovanni Mazzer, Scorzé (IT)

(*) Notice: Subject to any disclaimer, the term of this patent is extended or adjusted under 35 U.S.C. 154(b) by 18 days.

(21) Appl. No.: 14/891,656

(22) PCT Filed: Jun. 23, 2014

(86) PCT No.: PCT/EP2014/063186
§ 371 (c)(1),
(2) Date: Nov. 16, 2015

(87) PCT Pub. No.: WO2014/206944
PCT Pub. Date: Dec. 31, 2014

(65) Prior Publication Data
US 2016/0120366 A1   May 5, 2016

(30) Foreign Application Priority Data

Jun. 26, 2013 (IT) .............................. VE2013A0032

(51) Int. Cl.
*A47J 42/02* (2006.01)
*A47J 42/08* (2006.01)
*A47J 42/06* (2006.01)

(52) U.S. Cl.
CPC ............... *A47J 42/08* (2013.01); *A47J 42/02* (2013.01); *A47J 42/06* (2013.01)

(58) Field of Classification Search
CPC .................................. A47J 42/08; A47J 42/06
USPC ...................................................... 241/169.1
See application file for complete search history.

(56) References Cited

U.S. PATENT DOCUMENTS

| 5,542,342 A * | 8/1996 | McNeill | A47J 31/42 99/280 |
| 7,273,005 B2 * | 9/2007 | Turi | A47J 31/42 99/275 |
| 7,604,191 B2 * | 10/2009 | Pai | A47J 42/08 241/169.1 |
| 7,984,868 B2 * | 7/2011 | Anson | A47J 42/18 241/261.2 |
| 7,988,081 B2 * | 8/2011 | Robbins | A47J 42/08 241/101.2 |

(Continued)

FOREIGN PATENT DOCUMENTS

| EP | 2050377 A1 | 4/2009 |
| GB | 14690 | 5/1912 |
| WO | WO2011067116 A1 | 6/2011 |

*Primary Examiner* — Faye Francis
(74) *Attorney, Agent, or Firm* — Themis Law

(57) ABSTRACT

A coffee grinder includes a support base containing a grinding chamber, the base housing an electric motor coupled to a first shaft, to which a second shaft rotatably coupled but which is axially free, the second shaft rotating a movable grinding wheel; a sleeve, within which the second shaft rotates freely but is axially restrained, and which has a threaded lateral surface cooperating with a threaded portion rigidly coupled to the base, the movable grinding wheel being axially constrained to the sleeve; a fixed grinding wheel facing the movable grinding wheel in the interior of the grinding chamber, the fixed grinding wheel being fixedly coupled to the base frame; and a moving system that translates the sleeve axially.

3 Claims, 2 Drawing Sheets

(56) References Cited

U.S. PATENT DOCUMENTS

| | | | |
|---|---|---|---|
| 8,430,021 B2* | 4/2013 | Remo | A47J 31/42 99/275 |
| 8,776,671 B2* | 7/2014 | Van Os | A47J 31/42 99/286 |
| 2004/0182958 A1* | 9/2004 | Herren | A47J 42/08 241/169.1 |
| 2005/0029376 A1* | 2/2005 | Heng | A47J 42/08 241/169.1 |
| 2008/0098901 A1* | 5/2008 | Lee | A47J 42/50 99/286 |
| 2008/0185465 A1* | 8/2008 | Pai | A47J 42/08 241/100 |
| 2009/0127363 A1* | 5/2009 | Malykke | A47J 31/404 241/248 |
| 2010/0095852 A1* | 4/2010 | Remo | A47J 31/3614 99/280 |
| 2010/0170971 A1* | 7/2010 | Doglioni Majer | A47J 42/18 241/30 |
| 2014/0224910 A1* | 8/2014 | Sahli | A47J 42/06 241/246 |
| 2015/0157167 A1* | 6/2015 | Eicher | A47J 31/42 99/286 |

* cited by examiner

COFFEE GRINDER-DISPENSER

The present invention relates to a coffee grinder-dispenser.

Coffee grinder-dispensers are known comprising a casing housing two opposing grinding wheels, one of which is rotated by an electric motor, while the other is movable axially to the first, by the operation of a threaded ring engaging in a grinding wheel holder.

In these grinder-dispensers, continuous adjustment of the degree of grinding is achieved by the threaded coupling arrangement, which enables that grinding wheel movable axially to the motor-rotated grinding wheel to undergo axial approach and withdrawal movement within a grinding chamber.

Such known grinder-dispensers present however the drawback that, following disengagement of one of the two grinding wheels for cleaning the grinding chamber, a lengthy and laborious operation is required to return the grinding wheels to their correct degree of adjustment.

An object of the invention is to eliminate these drawbacks by providing a grinder-dispenser which enables the cleaning of the grinding chamber to be achieved easily and comfortably without disturbing the degree of adjustment which has been previously set.

This object is attained according to the invention by a coffee grinder-dispenser as described hereinafter.

Figure 1:
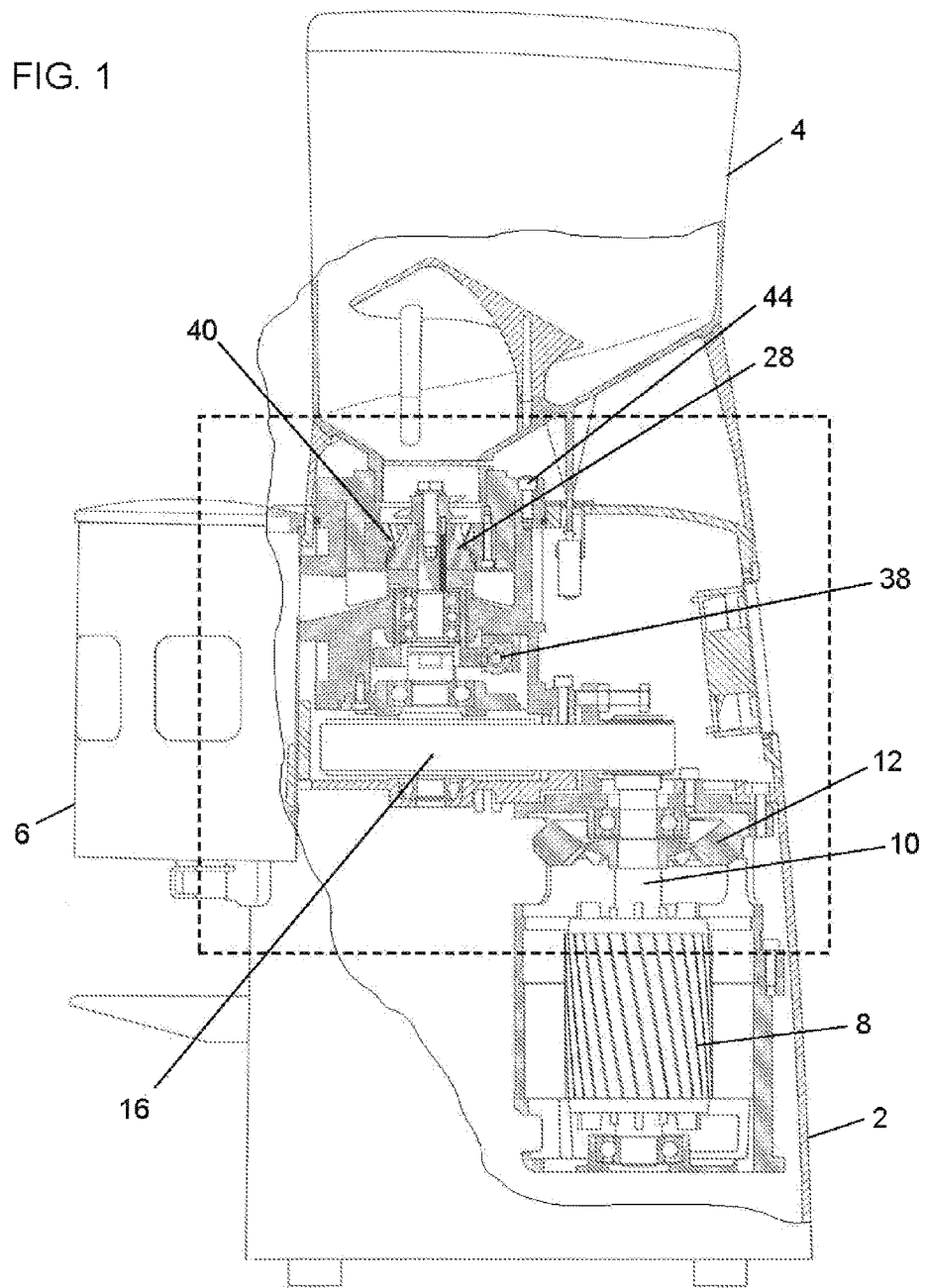
Figure 2:
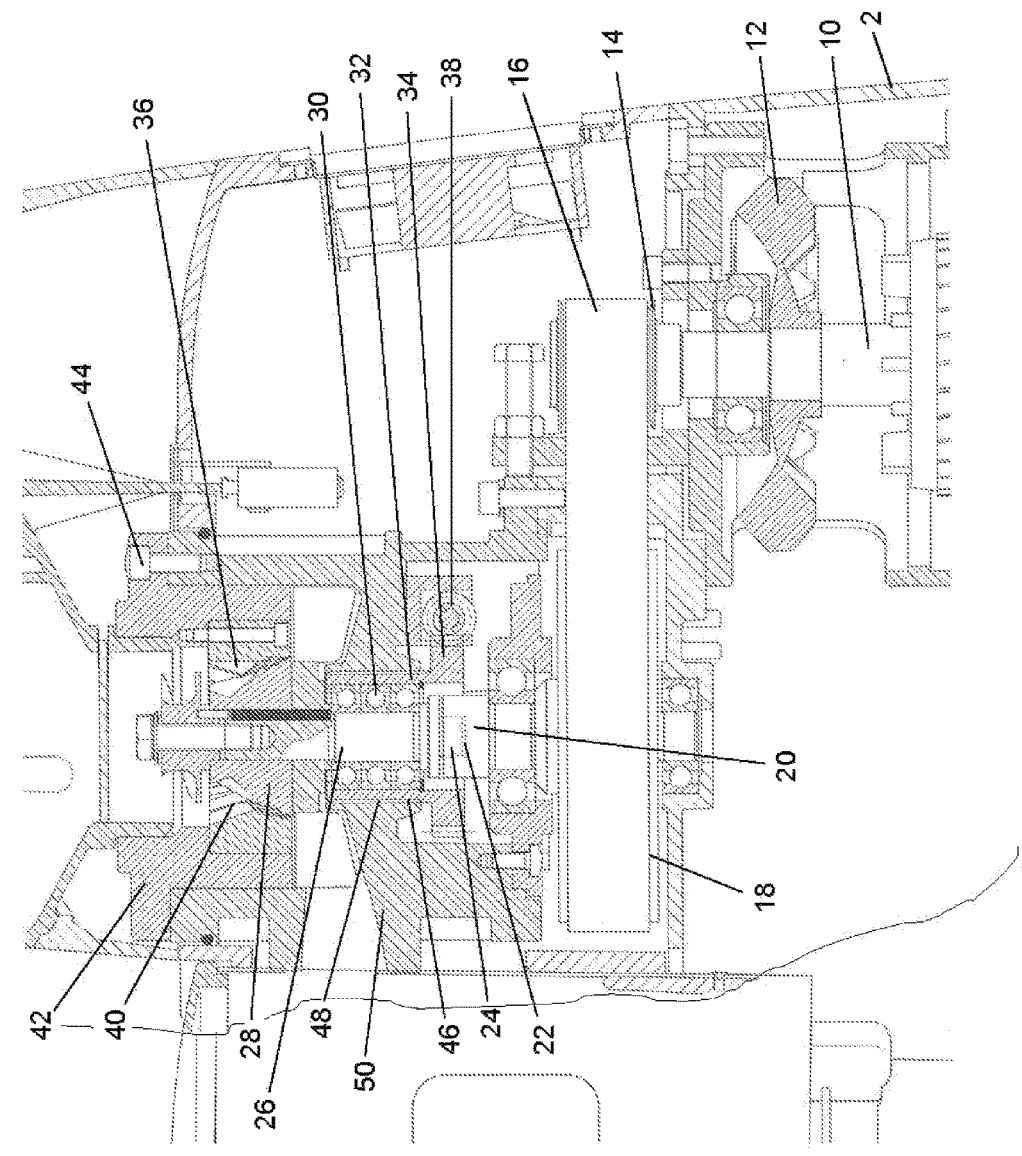

The present invention is further clarified hereinafter with reference to the accompanying drawings in which:

FIG. 1 is a partial longitudinal section through the grinder-dispenser according to the invention, and FIG. 2 shows the part indicated by dashed lines in FIG. 1.

As can be seen from the figures, the grinder-dispenser according to the invention is enclosed within a base 2 supporting a bell-shaped container 4 for containing coffee beans, and a dispenser 6 for portioning the ground coffee.

In the base 2 a motor 8 of vertical axis is mounted, the shaft 10 of which is rigid with a cooling fan 12 and a pulley 14.

The pulley 14 is connected via a belt 16 to a driven wheel 18 of diameter greater than the diameter of the pulley 14.

The driven wheel 18 is rotatably rigid with a shaft 20, the upper end of which is provided with a grooved seat 22 engaged by a corresponding head 24 of a shaft 26, which rigidly rotates the driven grinding wheel 28 positioned inside the grinding chamber 36.

The shaft 26 is guided axially by ball bearings 30 inserted into a sleeve 32 on which the driven grinding wheel 28 rests.

The shaft 26 rotates freely within the sleeve 32 but is axially constrained to it.

The sleeve 32 lowerly presents a gear wheel 34 with which a worm 38 cooperates.

The lateral surface of the sleeve 32 is provided with a thread 46 cooperating with a corresponding threaded portion 48 provided in a structure 50 rigid with the base 2.

The fixed grinding wheel 40 opposes the driven grinding wheel within the grinding chamber 36, and is connected to its grinding wheel holder 42 which is fixed to the base by screws 44.

In the operation of the grinder-dispenser according to the invention, on starting the electric motor 8, the shaft 20 is rotated via the linkage 10, 14, 16 and 18, and transmits its rotary movement to the shaft 24 which then rotates the driven grinding wheel 28.

To adjust the degree of grinding, the worm 38 which engages the gear wheel 34 of the sleeve 32 is rotated to cause it to rotate axially. Given the threaded coupling between the portions 46, 48, this rotation has the effect of raising and lowering the sleeve and consequently the driven grinding wheel relative to the fixed grinding wheel.

The adjustment of the degree of grinding is hence determined by the position of the driven grinding wheel 28, in that the fixed grinding wheel 40 is of fixed position determined by the mechanical connection with the grinding wheel holder 42 and the base 2.

To clean the grinding chamber, the screws 44 are removed and the fixed grinding wheel 40 removed without in any way varying the position of the driven grinding wheel 28 and without modifying the adjustment setting.

On repositioning the fixed grinding wheel 40 and the relative grinding wheel holder after cleaning, the previously set adjustment is maintained.

The invention claimed is:

1. A coffee grinder comprising:
   a support base containing a grinding chamber, said support base housing:
   an electric motor;
   a first shaft operatively coupled to the motor;
   a second shaft rotatably constrained to the first shaft but axially movable;
   a movable grinding wheel driven by the second shaft;
   a sleeve, within which said second shaft rotates freely but is axially restrained, said sleeve having a threaded lateral surface cooperating with a threaded portion fixedly coupled to the support base, said movable grinding wheel being axially constrained to said sleeve;
   a fixed grinding wheel facing said movable grinding wheel, said fixed grinding wheel being disposed within the grinding chamber and being fixed in a predetermined position to a frame in a non removable manner; and
   a moving system that causes said sleeve to rotate, said moving system comprising a worm gear that engages a gear wheel fixedly coupled to the sleeve.

2. The coffee grinder as claimed in claim 1, wherein the first shaft is connected to the second shaft with a pulley driven by the first shaft, said pulley being connected by a belt to a driven wheel, into which said second shaft is rotatably engaged but is axially free.

3. A coffee grinder comprising:
   a support base containing a grinding chamber, said support base housing:
   an electric motor;
   a first shaft operatively coupled to the motor;
   a second shaft is rotatably constrained to the first shaft but free to move axially;
   a movable grinding wheel driven by the second shaft;
   a sleeve, within which said second shaft rotates freely but is axially restrained, said sleeve having a threaded lateral surface cooperating with a threaded portion fixedly coupled to the support base, said movable grinding wheel being axially constrained to said sleeve;
   a fixed grinding wheel facing said movable grinding wheel, said fixed grinding wheel being disposed within the grinding chamber and being fixed in a predetermined position to a frame in a non removable manner; and
   a moving system that causes said sleeve to rotate, said moving system comprising a worm gear that engages a gear wheel fixedly coupled to the sleeve,
   wherein the first shaft is connected to the second shaft with a pulley driven by the first shaft, said pulley being connected by a belt to a driven wheel, into which said second shaft is rotatably engaged but is axially free, and wherein said second shaft is rotatably engaged by, but is axially free to slide within, a slotted seat provided on a third shaft that is fixedly coupled to the driven wheel.

\* \* \* \* \*